US012649623B2

(12) United States Patent
Wente et al.

(10) Patent No.:  US 12,649,623 B2
(45) Date of Patent:  Jun. 9, 2026

(54) ELECTRIC CABLE FOR REFUSE VEHICLE WITH SERVICE LIFT

(71) Applicant: Oshkosh Corporation, Oshkosh, WI (US)

(72) Inventors: Derek Wente, Oshkosh, WI (US);
Jacob Wallin, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 460 days.

(21) Appl. No.: 18/143,518

(22) Filed: May 4, 2023

(65) Prior Publication Data

US 2023/0356941 A1    Nov. 9, 2023

Related U.S. Application Data

(60) Provisional application No. 63/338,514, filed on May 5, 2022.

(51) Int. Cl.
B65F 3/26          (2006.01)
B60P 1/28          (2006.01)
(52) U.S. Cl.
CPC ............... B65F 3/26 (2013.01); B60P 1/283 (2013.01)
(58) Field of Classification Search
CPC .. B60P 1/283; B60P 1/16; B60P 1/165; B60P 1/22; B60P 1/28
USPC .......... 298/17 R, 18, 22 F, 21 V, 22 P, 22 R, 298/19 V; 296/183.2
See application file for complete search history.

(56) References Cited

U.S. PATENT DOCUMENTS

| | | | | | |
|---|---|---|---|---|---|
| 2,378,409 | A | * | 6/1945 | Joy ......................... | F41A 27/26 298/22 R |
| 2,493,150 | A | * | 1/1950 | Kroger ..................... | B60P 1/14 298/22 F |
| 6,139,062 | A | * | 10/2000 | Meyer ..................... | B60P 1/283 298/1 SG |
| 2016/0218332 | A1 | * | 7/2016 | Baek ..................... | H01M 50/211 |
| 2020/0346547 | A1 | | 11/2020 | Rocholl et al. | |
| 2020/0346556 | A1 | | 11/2020 | Rocholl et al. | |
| 2020/0346557 | A1 | | 11/2020 | Rocholl et al. | |
| 2020/0346854 | A1 | | 11/2020 | Rocholl et al. | |
| 2020/0346855 | A1 | | 11/2020 | Rocholl et al. | |
| 2020/0346856 | A1 | | 11/2020 | Rocholl et al. | |
| 2020/0346857 | A1 | | 11/2020 | Rocholl et al. | |

(Continued)

FOREIGN PATENT DOCUMENTS

CA            2216497        *   3/1998    ................ B60P 1/64

OTHER PUBLICATIONS

Office Action issued in connection with Canadian Appl. No. 3199010 dated Sep. 27, 2024.

*Primary Examiner* — Stephen T Gordon
(74) *Attorney, Agent, or Firm* — Foley & Lardner LLP

(57)          ABSTRACT
A vehicle includes a chassis, a battery coupled to chassis, and a body pivotally coupled to the chassis by a pivot assembly and including a terminal electrically coupled to one or more electrical components of the body. The vehicle further includes an actuator coupled to the body and the chassis and configured to lift and pivot the body relative to the chassis and a battery cable electrically coupling the battery to the terminal. The battery cable is configured to flex at a first angle when the body is in a first position supported by the chassis and configured to flex at a second angle when the body is in a second position lifted above the chassis.

13 Claims, 16 Drawing Sheets

(56) References Cited

U.S. PATENT DOCUMENTS

| | | | |
|---|---|---|---|
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0391643 A1* | 12/2020 | Sweeney | B60P 1/16 |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0399057 A1 | 12/2020 | Rocholl et al. | |
| 2021/0031611 A1 | 2/2021 | Yakes et al. | |
| 2021/0031612 A1 | 2/2021 | Yakes et al. | |
| 2021/0221216 A1 | 7/2021 | Yakes et al. | |
| 2021/0229908 A1 | 7/2021 | Rocholl et al. | |
| 2021/0252995 A1 | 8/2021 | Rocholl et al. | |
| 2021/0323436 A1 | 10/2021 | Rocholl et al. | |
| 2021/0323437 A1 | 10/2021 | Rocholl et al. | |
| 2021/0323438 A1 | 10/2021 | Rocholl et al. | |
| 2021/0324880 A1 | 10/2021 | Wente et al. | |
| 2021/0339632 A1 | 11/2021 | Rocholl et al. | |
| 2021/0339648 A1 | 11/2021 | Koga et al. | |
| 2021/0396251 A1 | 12/2021 | Clifton et al. | |
| 2022/0009338 A1 | 1/2022 | Yakes et al. | |
| 2022/0096884 A1 | 3/2022 | Koga et al. | |
| 2022/0097527 A1 | 3/2022 | Koga et al. | |
| 2022/0097555 A1 | 3/2022 | Koga et al. | |
| 2022/0097556 A1 | 3/2022 | Koga et al. | |
| 2022/0097633 A1 | 3/2022 | Koga et al. | |
| 2022/0097961 A1 | 3/2022 | Koga et al. | |
| 2022/0097962 A1 | 3/2022 | Koga et al. | |
| 2022/0097963 A1 | 3/2022 | Koga et al. | |
| 2022/0097964 A1 | 3/2022 | Koga et al. | |
| 2022/0099723 A1 | 3/2022 | Koga et al. | |
| 2022/0105827 A1 | 4/2022 | Rocholl et al. | |
| 2022/0169444 A1 | 6/2022 | Rocholl et al. | |
| 2022/0185582 A1 | 6/2022 | Koga et al. | |
| 2022/0219896 A1 | 7/2022 | Gary et al. | |
| 2022/0258965 A1 | 8/2022 | Kappers et al. | |
| 2022/0258967 A1 | 8/2022 | Kappers et al. | |
| 2022/0267090 A1 | 8/2022 | Rocholl et al. | |
| 2022/0307312 A1 | 9/2022 | Rocholl et al. | |
| 2022/0340359 A1 | 10/2022 | Rocholl et al. | |
| 2023/0039772 A1 | 2/2023 | Rocholl et al. | |
| 2023/0039974 A1 | 2/2023 | Rocholl et al. | |
| 2023/0042649 A1 | 2/2023 | Koga et al. | |
| 2023/0045720 A1 | 2/2023 | Rocholl et al. | |
| 2023/0047275 A1 | 2/2023 | Rocholl et al. | |
| 2023/0053238 A1 | 2/2023 | Koga et al. | |
| 2023/0089417 A1 | 3/2023 | Koga et al. | |
| 2023/0117427 A1 | 4/2023 | Turner et al. | |
| 2023/0120042 A1 | 4/2023 | Turner et al. | |
| 2023/0125077 A1 | 4/2023 | Gary et al. | |
| 2023/0173945 A1 | 6/2023 | Rocholl et al. | |
| 2023/0202301 A1 | 6/2023 | Rocholl et al. | |
| 2023/0202340 A1 | 6/2023 | Koga et al. | |

* cited by examiner

ELECTRIC CABLE FOR REFUSE VEHICLE WITH SERVICE LIFT

CROSS-REFERENCE TO RELATED PATENT APPLICATIONS

The present Application claims the benefit of and priority to U.S. Provisional Patent Application No. 63/338,514, filed on May 5, 2022, the entire disclosure of which is incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One implementation of the present disclosure relates to a vehicle including a chassis, a battery coupled to chassis, and a body pivotally coupled to the chassis by a pivot assembly and including a terminal electrically coupled to one or more electrical components of the body. The vehicle further includes an actuator coupled to the body and the chassis and configured to lift and pivot the body relative to the chassis and a battery cable electrically coupling the battery to the terminal. The battery cable is configured to flex at a first angle when the body is in a first position supported by the chassis and configured to flex at a second angle when the body is in a second position lifted above the chassis.

Another implementation of the present disclosure relates to a refuse vehicle comprising a chassis, a body positioned on top of and pivotally coupled to the chassis, the body including a refuse compartment configured to store refuse, and a battery coupled to a top portion of the body. The refuse vehicle further includes a battery cable electrically coupling the battery to a terminal coupled to a bottom portion of the body, and an actuator coupled to the body and the chassis and configured to lift and pivot the body relative to the chassis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Overview

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a battery cable for a refuse vehicle with a service lift is disclosed herein. A body of a refuse vehicle may be supported by a chassis of the refuse vehicle. The body of the refuse vehicle may include electrical components. The electrical components of the body may receive power from a battery assembly supported within an interior of the chassis below the body. As such, a battery cable may electrically couple the battery assembly to the body in order to provide power to the electrical components of the body. However, in some embodiments, the body may be lifted by a service lift coupled to the body and supported by the chassis. Therefore, the body may move relative to the chassis (and thus the battery assembly supported therein or thereon), due to the service lift. It would be advantageous to provide a battery cable configured to electrically couple the body to the battery assembly throughout the various positions of the body relative to the chassis. Systems and methods for providing such a battery cable are disclosed herein.

Figure 1:
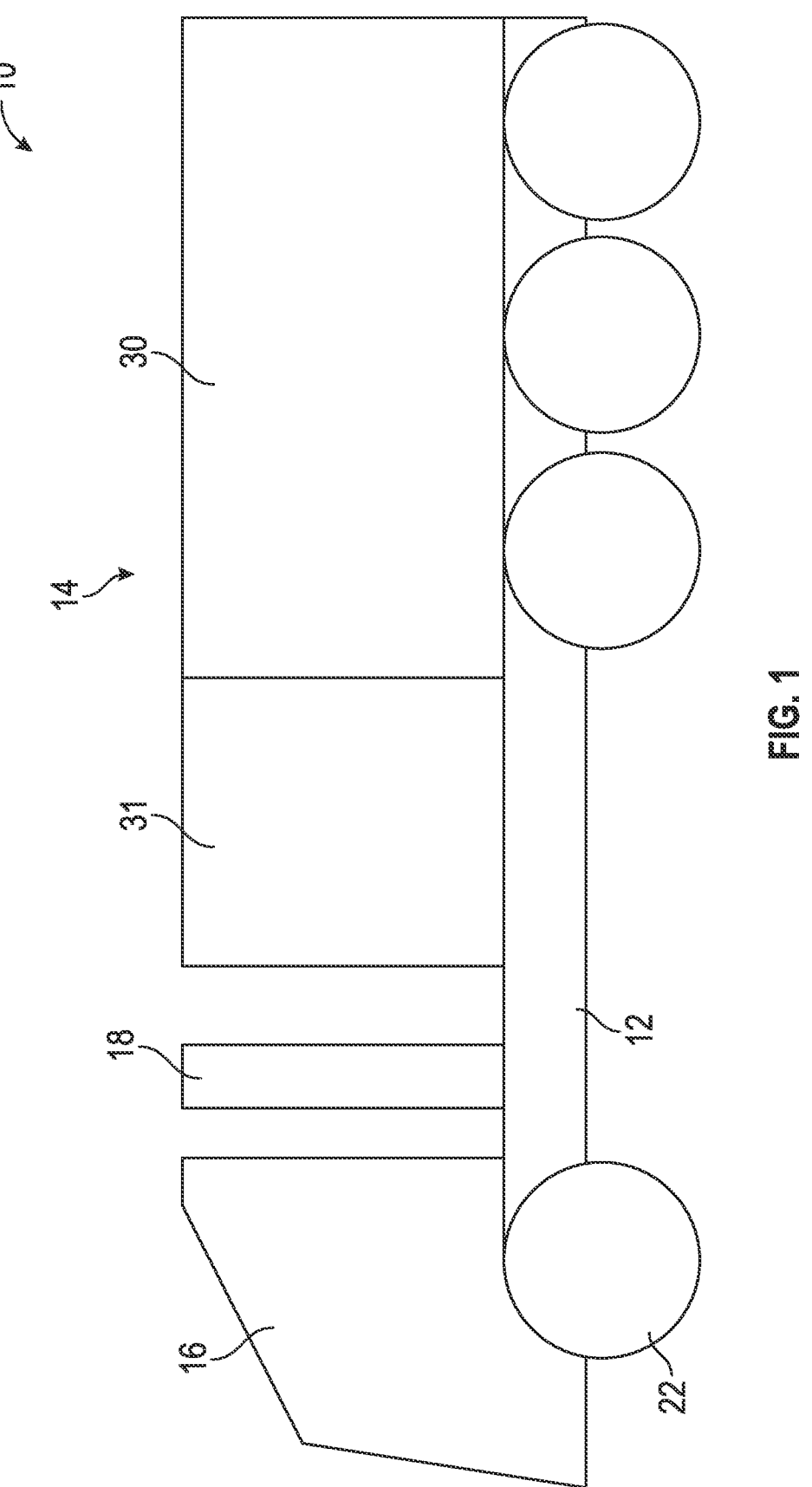
FIG. 1 is a side view of a refuse vehicle, according to some embodiments.

Referring now to FIG. 1, a vehicle is shown as refuse vehicle 10 (e.g., a garbage truck, a waste collection truck, a sanitation truck, a recycling truck, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.).

The cab 16 may include various components to facilitate operation of the refuse vehicle 10 by an operator (e.g., a seat, a steering wheel, actuator controls, a user interface, switches, buttons, dials, etc.). In some embodiments, the vehicle 10 includes a prime mover, shown as electric motor 18. In other embodiments, the prime mover is or includes an internal combustion engine. According to the exemplary embodiment shown in FIG. 1, the electric motor 18 is coupled to the frame 12 at a position behind the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 may be a refuse compartment and include a collection chamber (e.g., hopper, etc.). Loose refuse may be placed into the body 14 where it may thereafter be compacted (e.g., by a packer system, etc.). Thus, in some embodiments, the body may define a hopper volume 31 and storage volume 30. In this regard, refuse may be initially loaded into the hopper volume 31 and later compacted into the storage volume 30. The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14, including the refuse compartment 30, is positioned behind the cab 16. As shown, the hopper volume 31 is positioned between the storage volume 30 and the cab 16 (e.g., refuse is loaded into a portion of the body 14 behind the cab 16 and stored in a portion toward the front of the body 14). In other embodiments, the storage volume 30 may be positioned between the hopper volume 31 and the cab 16.

In some embodiments, the frame 12 acts as a storage portion that includes one or more vehicle components. The frame 12 may include an enclosure that contains one or more vehicle components and/or a frame that supports one or more vehicle components. By way of example, the frame 12 may contain or include one or more electrical storage devices (e.g., batteries, capacitors, etc.), as depicted in greater detail below with reference to FIG. 2. By way of another example, the frame 12 may include fuel tanks. By way of another example, the frame 12 may include a hydraulic tank, as depicted in greater detail below with reference to FIG. 5.

Figure 2:
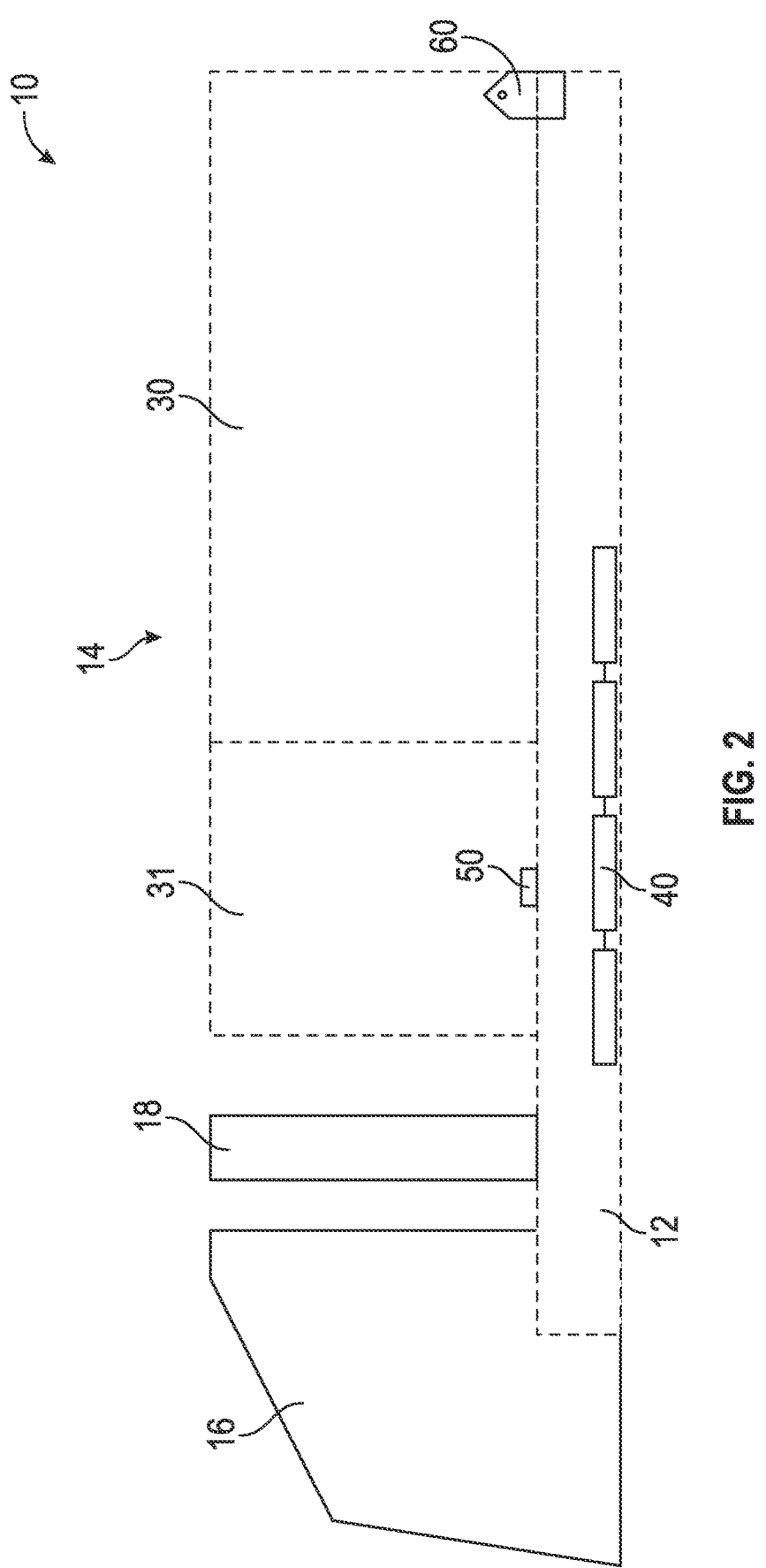
FIG. 2 is a side cross-sectional view of the refuse vehicle of FIG. 1, according to some embodiments.

Referring now to FIG. 2, a transparent view of the vehicle 10 is shown, according to some embodiments. As shown in FIG. 2, the refuse vehicle 10 includes an energy system, shown as energy storage and/or generation system 40. According to the exemplary embodiment shown in FIG. 1, the energy storage and/or generation system 40 is coupled to the frame 12 beneath the body 14. In other embodiments, the energy storage and/or generation system 40 is otherwise positioned (e.g., within a tailgate of the refuse vehicle 10, beneath the cab 16, along the top of the body 14, within the body 14, etc.).

According to an exemplary embodiment, the energy storage and/or generation system 40 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 40 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 40, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 40 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 40 includes a heat management system (e.g., liquid cooling, heat exchanger, air cooling, etc.).

In some embodiments, the energy storage and/or generation system 40 is coupled to the top portion of the body 14, as depicted in greater detail below with reference to FIG. 3. In other embodiments, the energy storage and/or generation system 40 is coupled to a side portion of the body 14. In some embodiments, the energy storage and/or generation system 40 is removable/detachable from the body 14. Locating the energy storage and/or generation system 40 on top of the body 14 facilitates easy access to the energy storage and/or generation system 40. For example, a user may readily inspect and service the energy storage and/or generation system 40 because it is located on an external surface of the refuse vehicle 10.

In some embodiments, the energy storage and/or generation system 40 may include one or more attachment mechanisms (e.g., pins, linkages, latches, etc.) to couple the energy storage and/or generation system 40 to the frame 12. In other embodiments, and as suggested above, the energy storage and/or generation system 40 is coupled to the body 14. In some embodiments, the energy storage and/or generation system 40 is a pod or battery compartment, configured to receive and electrically couple one or more batteries. For example, the energy storage and/or generation system 40 may allow a battery cell to be inserted from one end thereby coupling the battery cell to the energy storage and/or generation system 40 and providing power to the refuse vehicle 10. In some embodiments, the energy storage and/or generation system 40 is modular and facilitates easy replacement of one or more battery cells. For example, a second fully charged battery cell may replace a first depleted battery cell by uncoupling the first battery cell from the energy storage and/or generation system 40 and replacing it with the second battery cell. In some embodiments, the entire energy storage and/or generation system 40 is replaced with a different one of energy storage and/or generation system 40. Replacing one or more battery cells of the energy storage and/or generation system 40 reduces the downtime associated with charging a typical battery system. In some embodiments, the energy storage and/or generation system 40 is "hot-swappable" and is able to replace one or more battery cells without cutting power to the refuse vehicle 10.

The energy storage and/or generation system 40 may include an electric connection (e.g., a pantograph, a current collector, a high-voltage line, etc.) to allow the energy storage and/or generation system 40 to connect to external power sources (e.g., an overhead power line, the grid, a charging station, etc.). For example, the energy storage and/or generation system 40 may include a charging port to allow one or more battery cells to be charged while the energy storage and/or generation system 40 is coupled to the refuse vehicle 10 (e.g., by a 220V charger). For example, the refuse vehicle 10 may include a 220V charging port on a side of the body 14 to charge the energy storage and/or generation system 40. In some embodiments, the energy storage and/or generation system 40 includes an electrical bypass to power the refuse vehicle 10 from a charging source while the battery is being charged. In some embodiments, the energy storage and/or generation system 40 connects to one or more power sources of refuse vehicle 10 (e.g., an internal combustion generator, a battery, etc.) to charge the energy storage and/or generation system 40. For example, the energy storage and/or generation system 40 may include a connection to an onboard diesel generator configured to provide power to the energy storage and/or generation system 40 for charging. By way of another example, the energy storage and/or generation system 40 may include a connection to a terminal 50, which in turn provides power to various electrical components stored on the body 14.

In some embodiments, the vehicle 10 includes a bracket (depicted herein as a pivot assembly 60) configured to facilitate rotatable movement of the body 14 relative to the frame 12. The pivot assembly 60 pivotally couples the frame 12 to the body 14, such that the body 14 is rotatable relative to the frame 12 about a lateral axis formed by a crossbar, depicted in greater detail below with reference to FIG. 14. The pivot assembly 60 is configured to facilitate free movement of the body 14 relative to the frame 12 (e.g., to facilitate lifting the body 14 to perform maintenance on components beneath the body 14, forward of the body 14, and/or within the frame 12.

Figure 3:
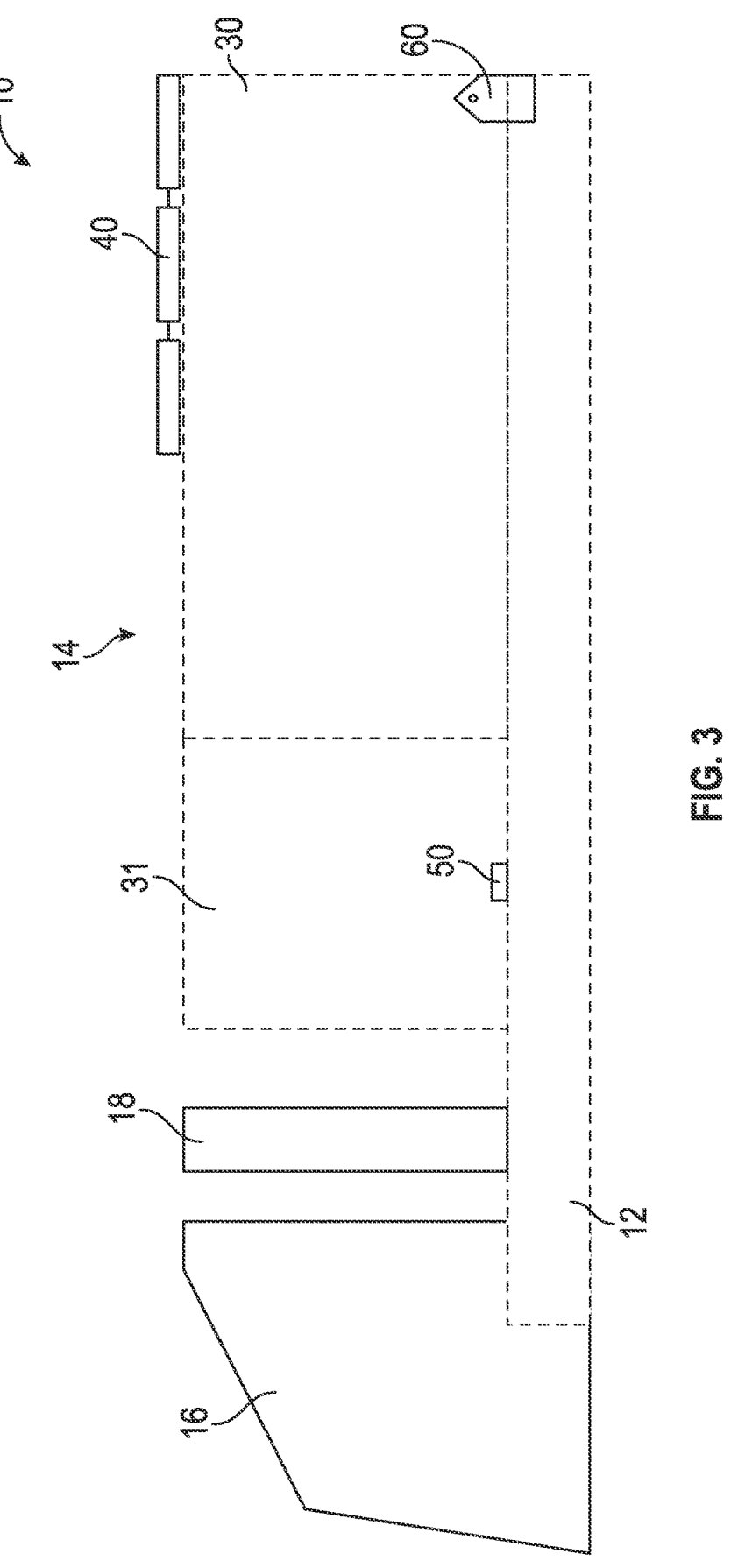
FIG. 3 is another side cross-sectional view of the refuse vehicle of FIG. 1, according to some embodiments.

Referring now to FIG. 3, and as suggested above, the energy storage and/or generation system 40 may be coupled to the top portion of the body 14.

Figure 4:
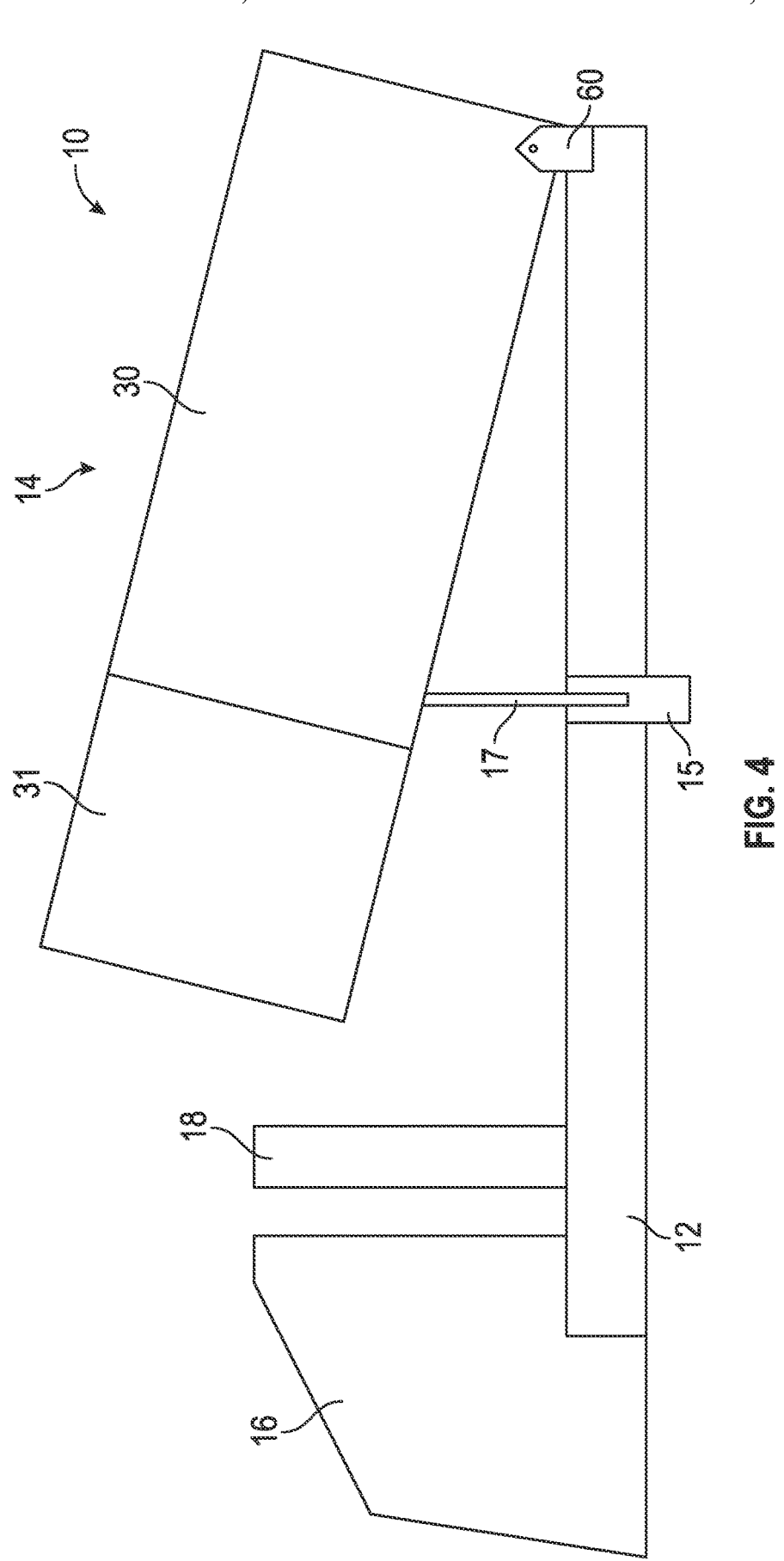
FIG. 4 is a side view of the refuse vehicle of FIG. 1 with a body lifted relative to the chassis, according to some embodiments.

Referring now to FIG. 4, the vehicle 10 is shown with the body 14 lifted by one or more hydraulic cylinders, shown as lift cylinders 17. The lift cylinders 17 are coupled to and extend between the body 14 and the frame 12. The lift cylinders 17 are positioned forward of the pivot assembly 60 and rearward of the cab 16. In some embodiments, the lift cylinders 17 can be used to apply an upward force to lift the body 14 relative to the frame 12 (e.g., when performing maintenance). In some embodiments, the lift cylinders 17 provide a damping force that opposes movement of the body 14 relative to the frame 12. The lift cylinders 17 may be rotatably coupled to lift brackets 15. The lift brackets 15 are fixedly coupled (e.g., welded, bolted, etc.) to opposite sides of the frame 12.

As described above, in some embodiments, the energy storage and/or generation system 40 is removable and/or replaceable. The energy storage and/or generation system 40 may be accessed within the frame 12, particularly when the body 14 is lifted relative to the frame 12. Similarly, the energy storage and/or generation system 40 may be removed and/or replaced by another energy storage and/or generation system. Alternatively, one or more individual battery cells of the energy storage and/or generation system 40 could be replaced. In some embodiments, the energy storage and/or generation system 40 can be accessed by removing the refuse compartment 30. For example, a refuse vehicle with a removable refuse compartment (e.g., a container truck) may remove the refuse compartment to reveal the energy storage and/or generation system 40. As disclosed herein, lifting the body 14 relative to the frame 12 may advantageously improve access to the energy storage and/or generation system 40. Moreover, lifting the body 14 relative to the frame 12 may advantageously facilitate maintenance of the body 14 and the various components stored in, or supported by, the frame 12.

Figure 5:
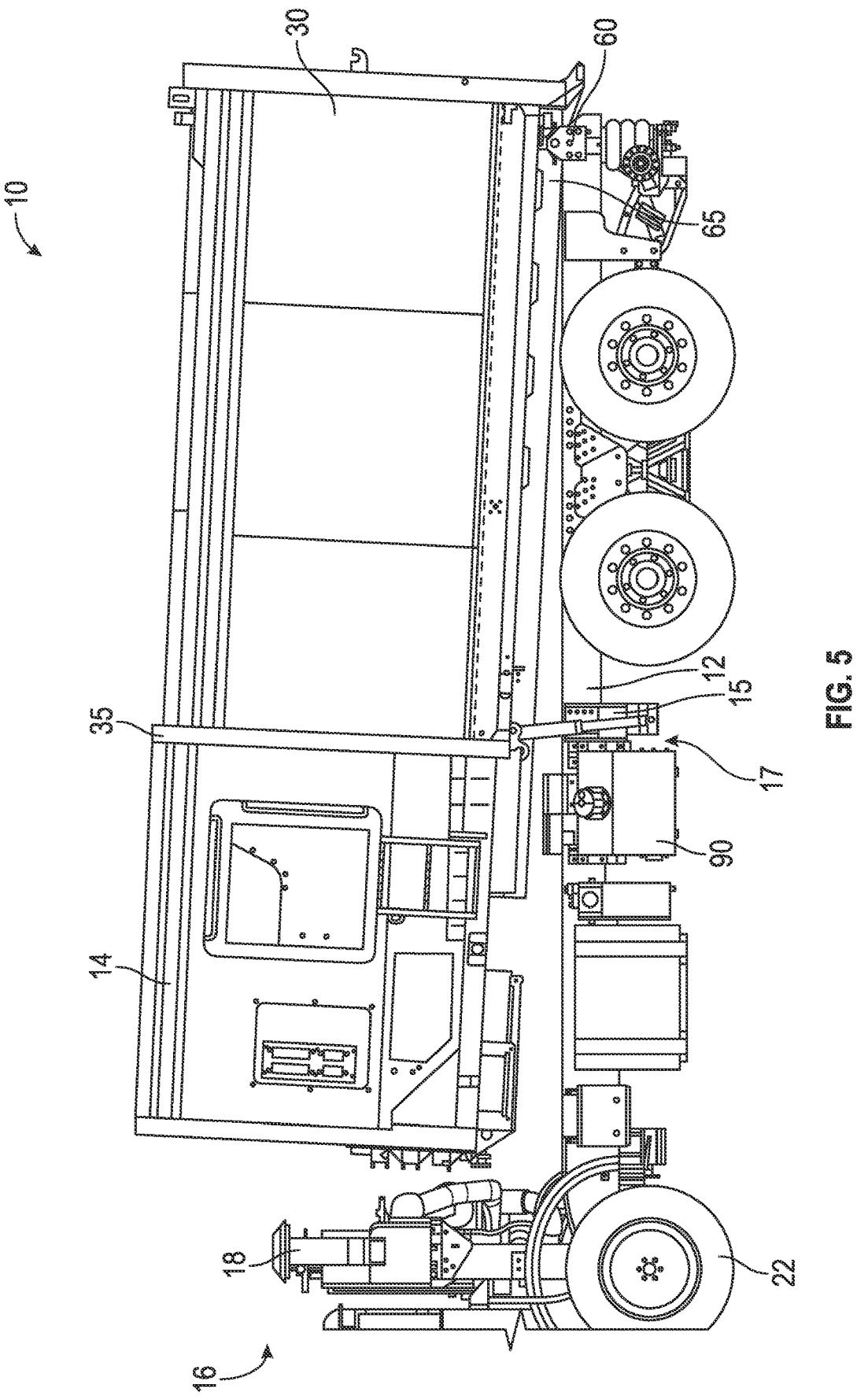
FIG. 5 is a detailed side view of the refuse vehicle of FIG. 5, according to some embodiments.

Referring now to FIG. 5, a more detailed depiction of the vehicle 10 being lifted by the lift cylinders 17 is shown, according to some embodiments. As shown, the lift brackets 15 may be rotatably coupled to a base 65 of the body 14. In some embodiments, the lift cylinders 17 are rotatably coupled to the base 65 of the body 14 by one or more devises fixedly coupled to the base 65. Each of the lift cylinders 17 include a first end or frame end coupled to the frame 12, and a second end or body end, coupled to the body 14 (e.g., via the base 65 of the body 14). The frame ends of the lift cylinders 17 may be coupled to the base 65 of the body 14 under, near, or on a structural member positioned towards the middle of the body 14, shown as mid-posts 35. The mid-posts 35 may be positioned at a distance away from the rear end of the body 14 that is greater than the distance of a center of gravity of the body 14 from the rear end of the body 14. In other embodiments, the center of gravity of the body 14 is positioned at the mid-posts 35 or forward of the mid-posts 35. As such, the much of the force generated against the body 14 during operation of the lift cylinders 17 (and thus the lifting of the body 14) may be directed through the mid-posts 35 to reduce stresses within other portions of the body 14. The frame ends of the lift cylinders 17 are configured to move relative to the body end. In operation the lift cylinders 17 extend (e.g., the frame ends move away from the body ends) as the body 14 moves upward relative to the frame 12. Similarly, the lift cylinders 17 retract (e.g., the frame ends move towards the body ends) as the body 14 moves downward relative to the frame 12. Accordingly, the lift cylinders 17 can control the relative position of the body 14 and the frame 12. By way of example, if hydraulic fluid were added to a chamber within each of the lift cylinders 17 (e.g., a volume within the body ends of the lift cylinders 17), the lift cylinders would extend and raise the body 14. If hydraulic fluid were allowed to be released from the chamber within each of the lift cylinders 17, the lift cylinders 17 would retract and lower the body 14. Thus, the amount of fluid in each of the lift cylinders 17 may be varied by an operator to raise or lower the body 14. The hydraulic fluid may be stored in one or more hydraulic tanks, shown as hydraulic tank 90. In some embodiments, and as shown, the lift cylinders 17 are positioned rearwards along the frame 12 relative to the hydraulic tank 90. In other embodiments, the lift cylinders 17 are positioned forwards along the frame 12 relative to the hydraulic tank 90. In some embodiments, the frame 12 is permitted to flex in response to varying loadings due to lifting of the body 14. In some embodiments, the lift cylinders 17 may be electrically powered actuators (e.g., electromechanical actuators) that are electrically coupled to the terminal 50 and powered by the energy storage and/or generation system 40 (e.g., a battery). For example, the electromechanical actuator may include a cylinder base that coupled to the body 14 and electrically coupled to the terminal 50. The terminal may be coupled to an underside (e.g., the bottom) of the body 14. An actuator rod may extend from the cylinder base and be coupled to the frame 12. The actuator 17 may receive power from the battery, via the battery cable 80 (described below) and the terminal, and the rod may extend from the base, causing the body 14 to be lifted and pivoted relative to the frame 12. Thus, the electrical connections to the actuator 17 may be on the body 14 side of the vehicle, with no direct electrical connections to the actuator on the frame 12 side. This may reduce the complexity of the electrical connections needed on the frame 12 side compared to an embodiment in which the cylinder base is electrically connected to the battery on the frame 12 side and the actuator rod is coupled to the body. In some embodiments, all of the actuators in the vehicle 10 (e.g., lift actuators, tailgate actuators, packer actuators, grabber actuators, etc.) may be electromechanical actuators, and the vehicle 10 may not include a hydraulic tank 90.

Figure 6:
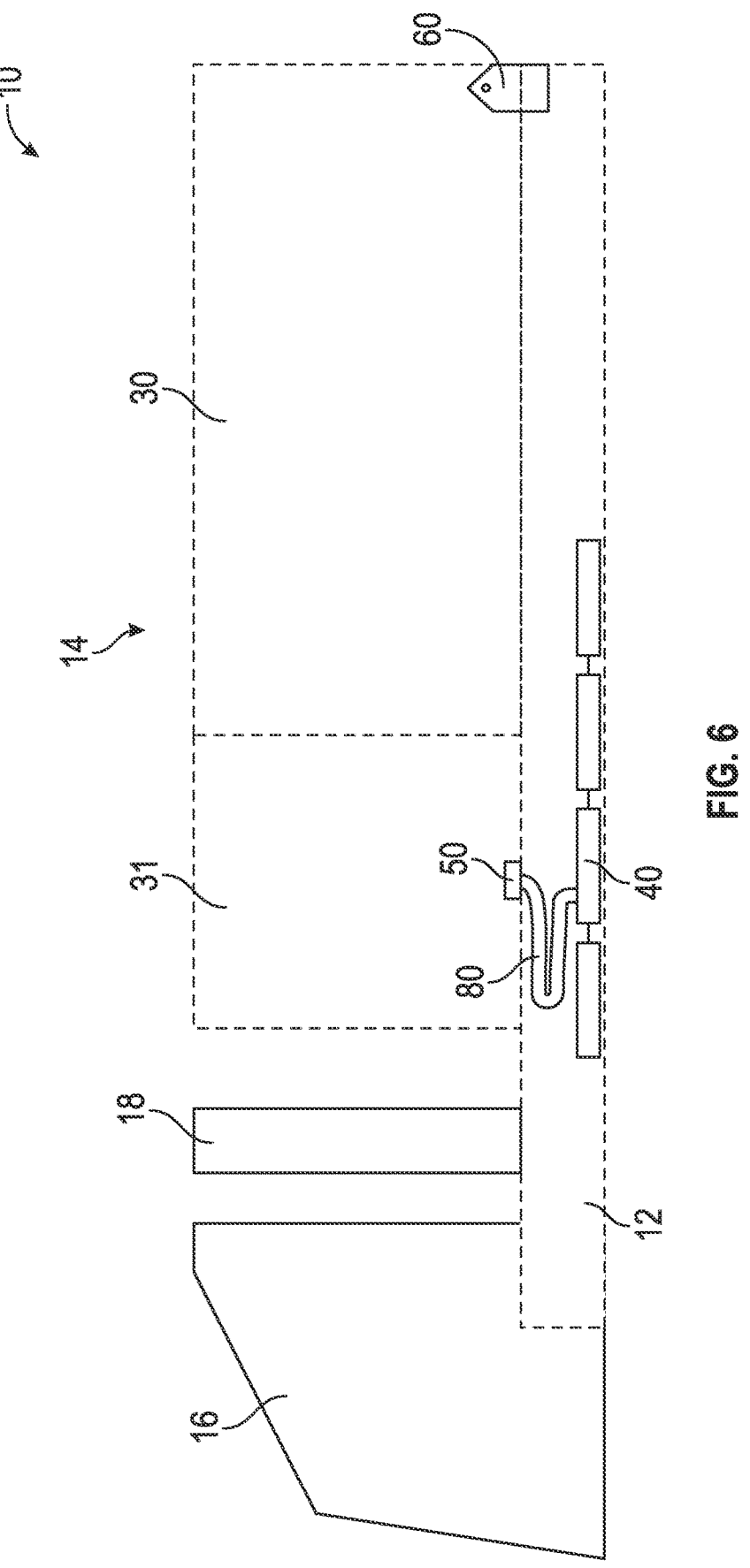
FIG. 6 is a side cross-sectional view of the refuse vehicle of FIG. 1 with a battery cable, according to some embodiments.

Referring now to FIG. 6, the vehicle 10 is shown to include a cable (e.g., a conduit, wire, tube, high voltage cable, etc.) shown as battery cable 80. The battery cable 80 may connect and electrically couple the energy storage and/or generation system 40 to the terminal 50 of the body 14. For example, the energy storage and/or generation system 40 may include a disconnect box to electrically couple the energy storage and/or generation system 40 to one end of the battery cable 80. As such, the battery cable 80 may facilitate the transfer of electrical energy from the energy storage and/or generation system 40 to the terminal 50, which in turn transfers the electrical energy to the various electrical components of the body 14. However, in some embodiments, the battery cable 80 may be configured to supply power to other components of the vehicle 10, such as the electric motor 18, the cab 16, and so on. Thus, although depicted herein as connecting the energy storage and/or generation system 40 to the terminal 50 of the body 14, in some embodiments, the battery cable 80 may be configured to connect to similar terminals associated with other components of the vehicle 10, or the terminal 50 may simply be configured to distribute power to components beyond those which are associated with the body 14.

Figure 7:
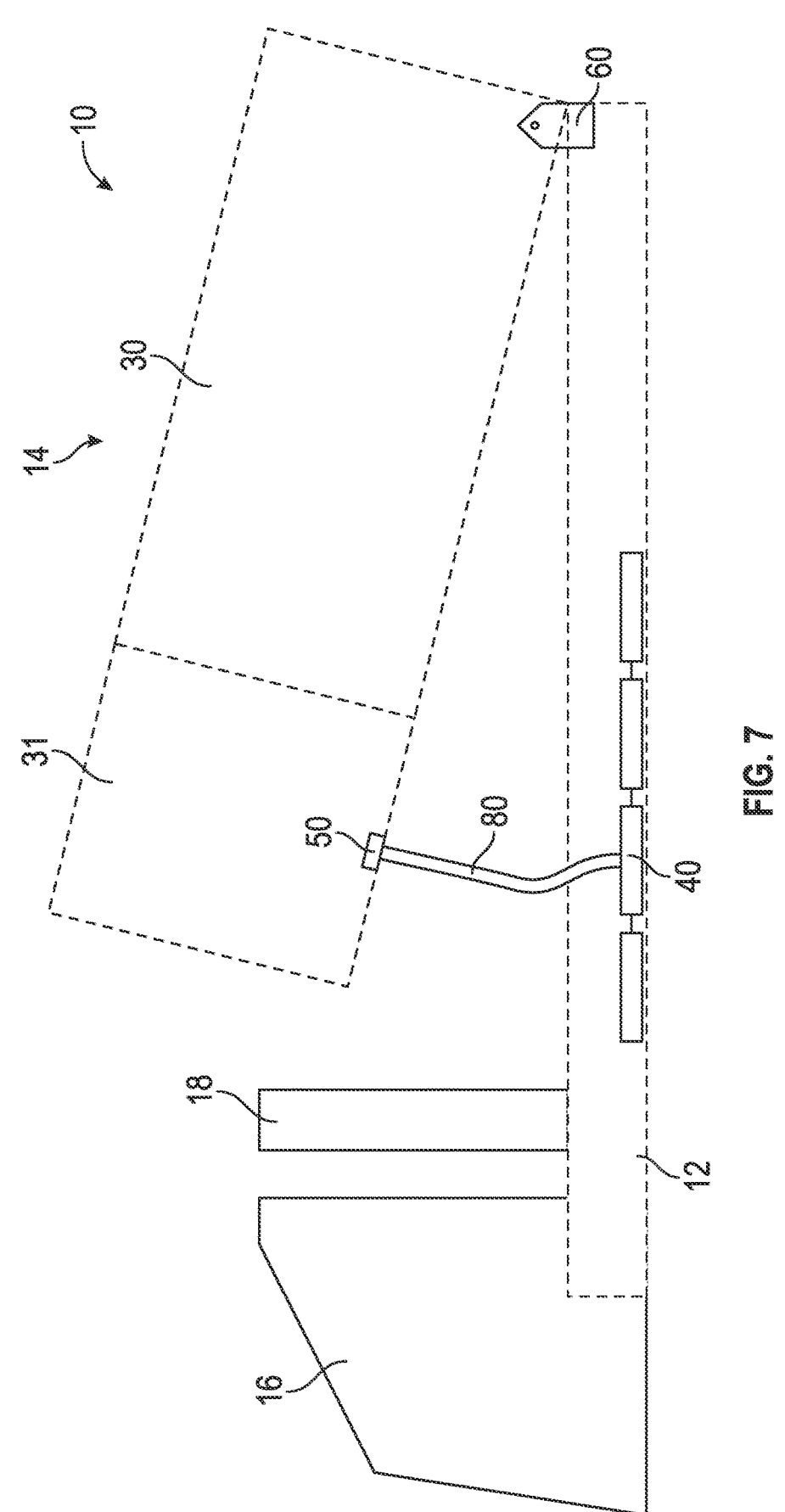
FIG. 7 is a side-cross sectional view of the refuse vehicle of FIG. 6 with a body lifted relative to a chassis, according to some embodiments.

In some embodiments, and as suggested above, the body 14 (and the terminal 50 stored thereon) may be configured to be lifted relative to the frame 12 (and the energy storage and/or generation system 40 located thereon) by the lift cylinders 17. Accordingly, the battery cable 80 may be configured to bend, stretch, and contort as necessary to transition between various positions depending on the position of the body 14 relative to the frame 12. In some embodiments, the battery cable 80 may be positioned within a chain housing (e.g., a chain conduit, a cable track, etc.), such that a series of durable housings enclose portions of the battery cable 80 and are linked in order to form angles relative to one another. Such a configuration may allow the battery cable 80 to flex while being resistant to contacts and pressures resulting from the various arrangements of the battery cable 80 disclosed herein. The battery cable 80 may be configured to flex at a first angle when the body 14 is in a first position supported by and parallel to the frame 12 and configured to flex at a second angle when the body is lifted and pivoted relative to the frame 12. For example, as shown in FIG. 6, with the body 14 in a first position resting on and parallel to the frame 12, the battery cable 80 may form a 180-degree loop or turn (e.g., a half-loop), with the first end of the battery cable 80 (e.g., coupled to the battery 40) and the second end of the battery cable 80 (e.g., coupled to the terminal 50) being substantially parallel. As shown in FIG. 7, when the body 14 is lifted and pivoted relative to the frame 12 to a second position, the first end of the battery cable 80 may form an obtuse angle with the second end of the battery cable 80. In some embodiments, and as shown, the battery cable 80 is entirely positioned forward of the pivot assembly 60. In some embodiments, the battery cable 80, from the energy storage and/or generation system 40 to the terminal 50, runs generally in the direction of the cab 16 for a distance, loops back in the direction of the pivot assembly 60, and runs a distance in the direction of the pivot assembly 60 before connecting to the terminal 50. Thus, in some embodiments, and as shown, when the body 14 is a position such that it rests on, or is in full contact with, the frame 12 (e.g., in a fully horizontal orientation), the battery cable 80 is substantially housed within the frame 12. That is, the battery cable 80 may not extend above the upper surface of the frame 12 (e.g., an upper surface of the frame rails 72, 74) or below the lower surface of the frame 12 (e.g., a lower surface of the frame rails 72, 74), and may be positioned between the frame rails 72, 74. In some embodiments, the battery cable 80 may be secured by one or more fasteners (e.g., clips, rings, brackets, etc.) at points on the frame 12 and/or the bottom of the body 14 (or the base 65 of the body 14, as depicted above with reference to FIG. 5). For example, the battery cable 80 may be secured at approximately equal intervals (e.g., every 20 inches, 30 inches, etc.). In such cases, securing the battery cable 80 may be facilitated through positioning the battery cable 80 within the chain housing and securing the particular housings of the chain housing as described above.

In some embodiments, arranging the battery cable 80 as shown may minimize a relative amount of electrical loss that is associated with the length of the battery cable 80 required to connect the energy storage and/or generation system 40 to the terminal 50 (or other components of the vehicle 10). For example, the length of the battery cable 80 as shown may be less than the length of the battery cable 80 necessary for other arrangements, such as the arrangement of the battery cable 80 as depicted with reference to FIG. 10, described in greater detail below.

Referring now to FIG. 7, the battery cable 80 as oriented above with reference to FIG. 6 is shown when the body 14 has been lifted relative to the frame 12, according to some embodiments. As shown, lifting the body 14 relative to the frame 12 may cause the battery cable 80 to bend into a new arrangement. In some embodiments, the battery cable 80 continues to generally form a back-tracking loop, with a lower portion that runs in the direction of the cab 16 and then curves upward and rearward toward the pivot assembly 60 as depicted in FIG. 7. However, due to the semi-rigid length of the battery cable 80, lifting the body 14 may result in the amount of the battery cable 80 running in the direction of the cab 16 to shorten by an amount before looping back toward the pivot assembly 60 as the battery cable 80 progresses from the energy storage and/or generation system 40 towards the terminal 50.

Figure 8:
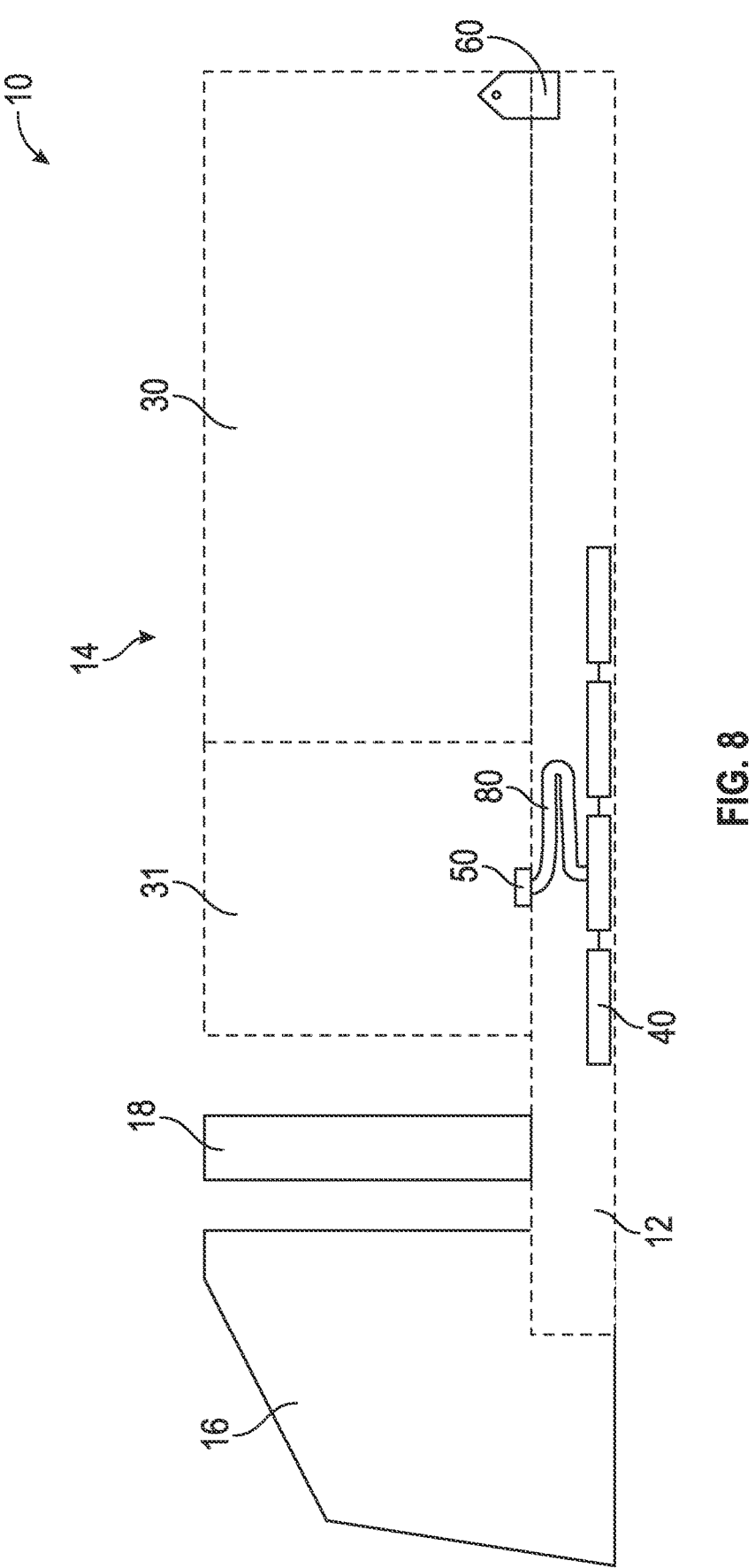
FIG. 8 is another side cross-sectional view of the refuse vehicle of FIG. 1 with a battery cable, according to some embodiments.

Referring now to FIG. 8, the battery cable 80 is shown in an alternative arrangement with the body 14 resting on the frame 12. As shown, and as opposed to the battery cable 80 as depicted in FIG. 6, the battery cable 80 is still generally positioned within the frame 12 and entirely forward of the pivot assembly 60, yet in the embodiment depicted, the battery cable 80 runs from the energy storage and/or generation system 40 in the direction of the pivot assembly 60 before looping back toward the cab 16 and running toward the cab 16 before connecting to the terminal 50.

Figure 9:
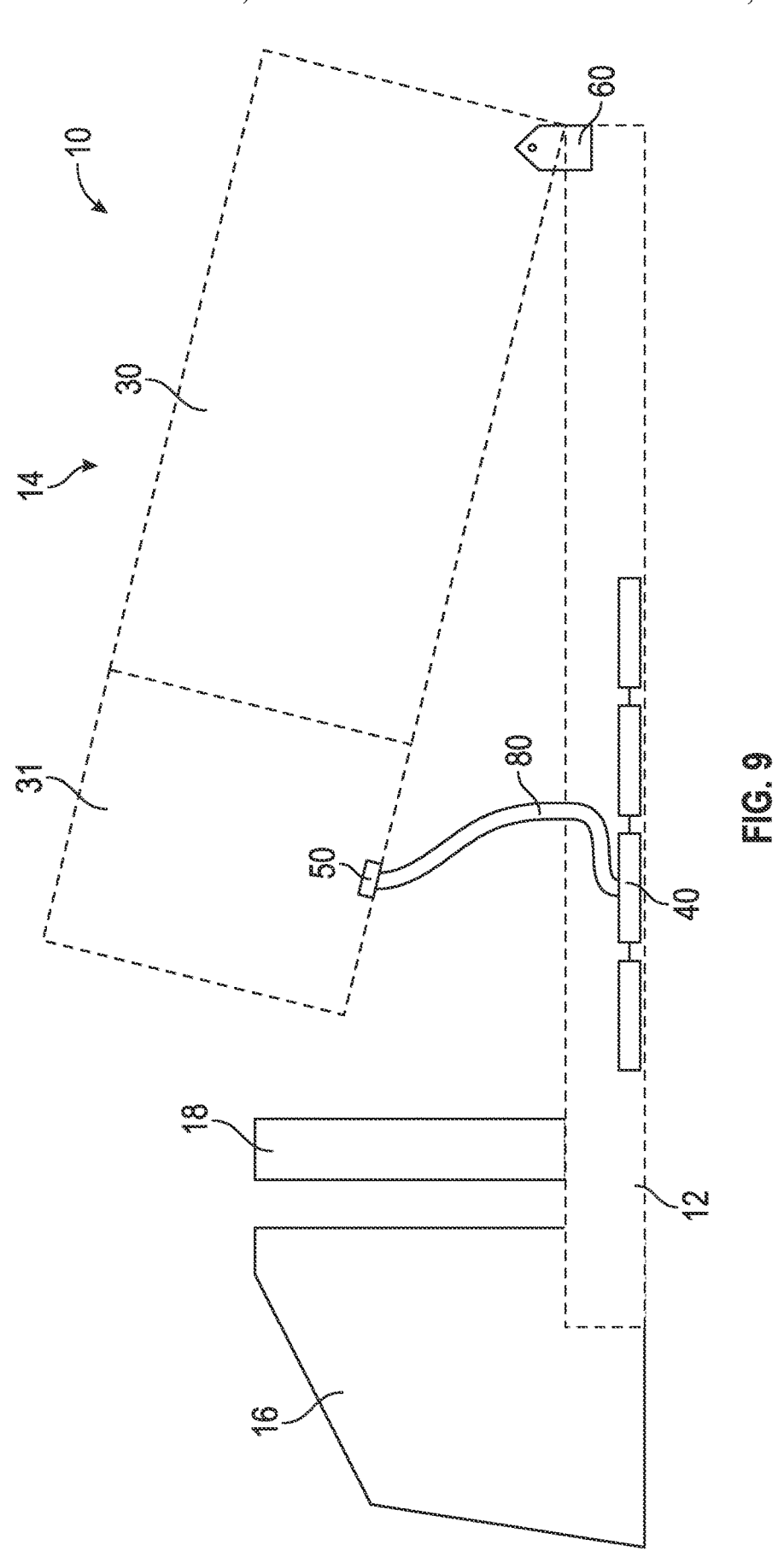
FIG. 9 is a side cross-sectional view of the refuse vehicle of FIG. 8 with a body lifted relative to a chassis, according to some embodiments.

Referring now to FIG. 9, the battery cable 80 is shown in the alternative arrangement depicted with reference to FIG. 8, with the body 14 in a lifted position. As shown, and as opposed to the battery cable 80 as depicted in FIG. 7, the battery cable 80 flexes in the opposite direction as shown in FIG. 7 to connect the energy storage and/or generation system 40 to the terminal 50. Specifically, the lower portion of the battery cable runs towards the pivot assembly 60 before curving upward and forwardly towards the cab 16.

Figure 10:
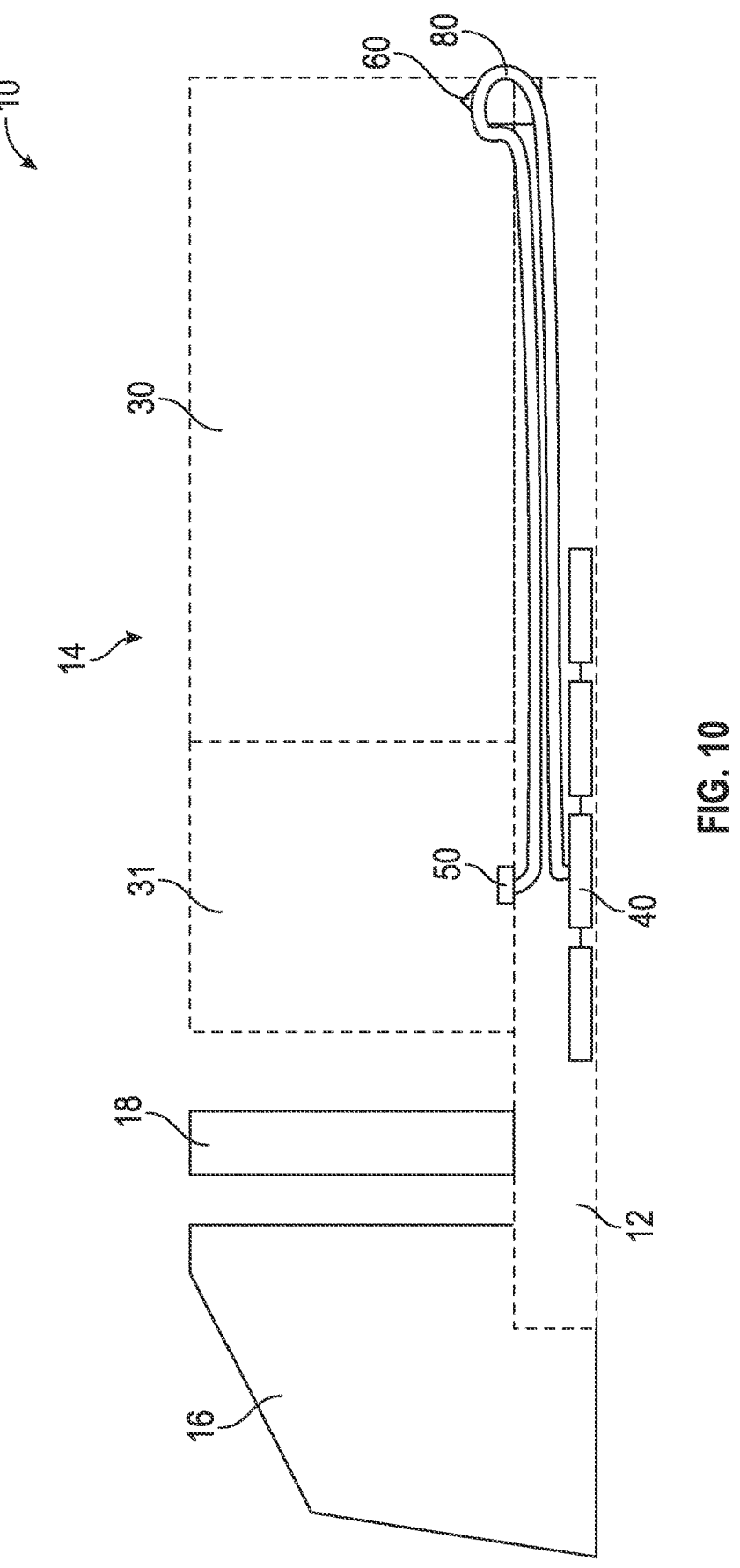
FIG. 10 is another side cross-sectional view of the refuse vehicle of FIG. 1 with a battery cable, according to some embodiments.

Referring now to FIG. 10, the battery cable 80 is shown in an alternative arrangement. with the body 14 resting on the frame 12. As shown, the battery cable 80 is connected to the energy storage and/or generation system 40 forward of the pivot assembly 60, runs along the frame 12 towards the pivot assembly 60, around a pivot (e.g., the pivot or crossbar 66 of the pivot assembly 60 depicted in FIG. 16) of the pivot assembly 60, and back towards the cab 16 until the battery cable 80 connects to the terminal 50. In some embodiments, when the body 14 is resting on the frame 12, in the fully horizontal orientation, the battery cable 80 may not extend above the upper surface of the frame 12 (e.g., an upper surface of the frame rails 72, 74) or below the lower surface of the frame 12 (e.g., a lower surface of the frame rails 72, 74) and may be positioned between the frame rails. Thus, the battery cable may be substantially contained within the frame 12 and below the body 14. In some embodiments, and as shown, the battery cable 80 runs around the pivot 66 from below, around the back of the pivot 66, and over the pivot 66. Thus, in some embodiments, the battery cable may include a 180-degree loop that extends above the frame rails 72, 74, while the first and second ends do not extend above or below the frame rails 72, 74 and are substantially parallel to each other. The routing of the battery cable 80 as depicted may occur within the frame 12, outside the frame 12, or above the frame 12. The routing of the battery cable 80 around the pivot 66 as depicted is described in greater detail below with reference to FIG. 16.

Figure 11:
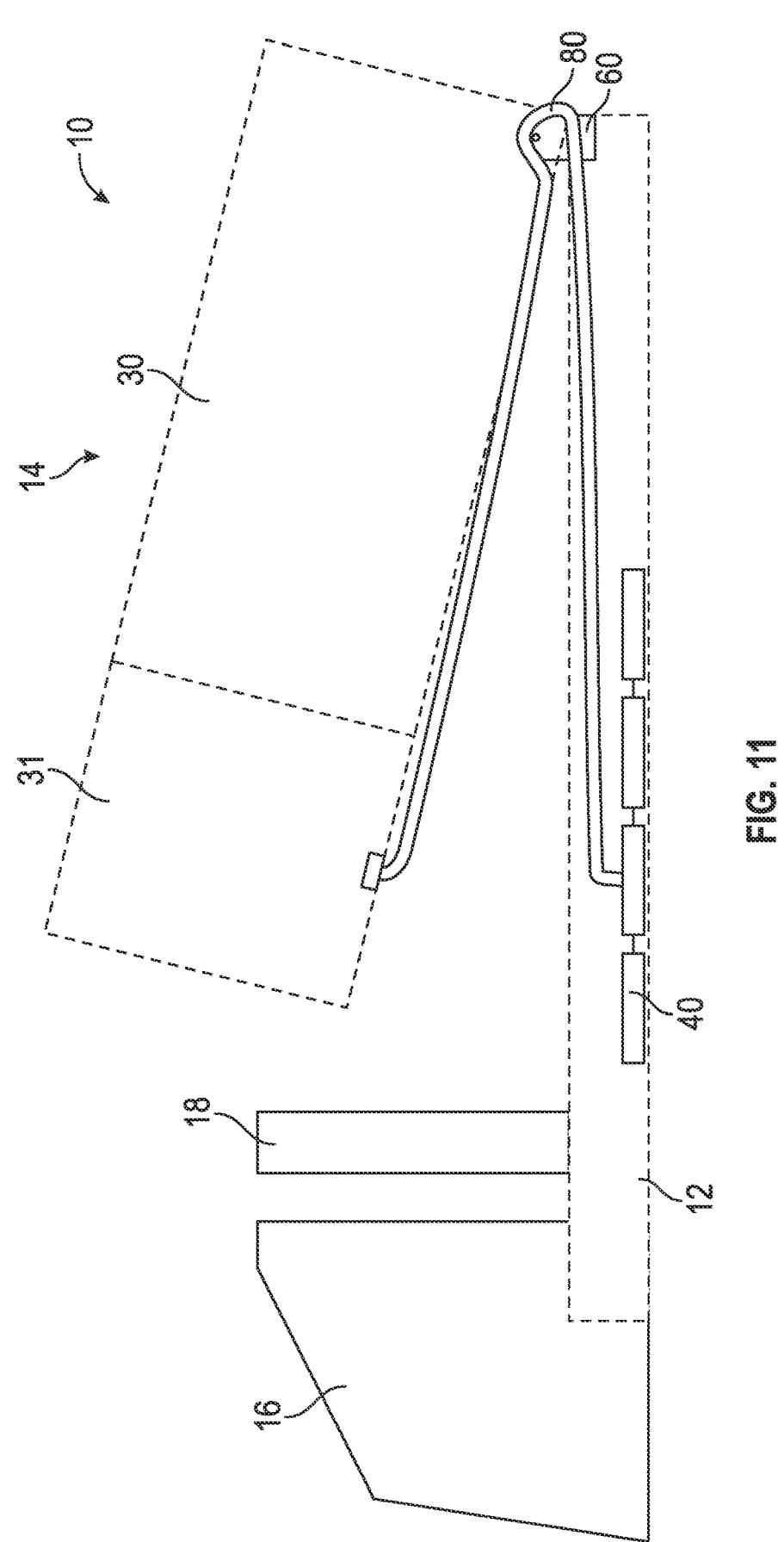
FIG. 11 is a side cross-sectional view of the refuse vehicle of FIG. 10 with a body lifted relative to a chassis, according to some embodiments.

Referring now to FIG. 11, the battery cable 80 is shown as arranged with reference to FIG. 10, with the body 14 lifted relative to the frame 12. As shown, the battery cable 80 runs around the pivot 66 as suggested above with reference to FIG. 10 and is flexed (relative to the position of the battery cable 80 as depicted above with reference to FIG. 10) to connect to the terminal 50. Because the battery cable 80 runs around the pivot 66, the battery cable does not "hang down" from the underside of the body 14 when the body 14 is lifted. Instead, the battery cable 80 may be substantially fixed against the underside of the body 14

Figure 12:
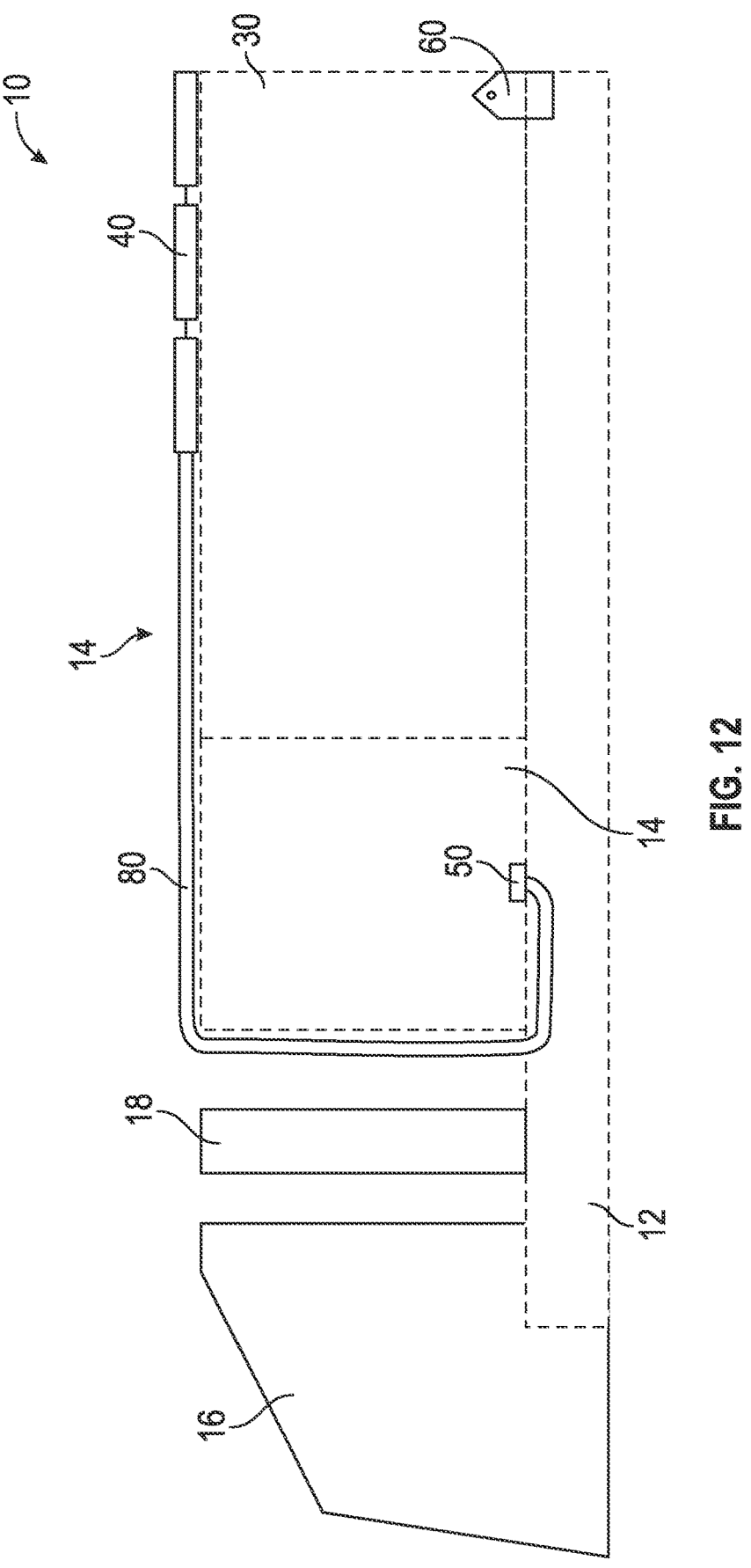
FIG. 12 is another side cross-sectional view of the refuse vehicle of FIG. 1 with a battery cable, according to some embodiments.

Referring now to FIG. 12, the battery cable 80 of the vehicle 10 is shown connecting the energy storage and/or generation system 40 to the terminal 50 with the energy storage and/or generation system 40 positioned on top of the body 14. In some embodiments, and as shown, the energy storage and/or generation system 40 may be positioned towards the rear of the body 14. As such, the battery cable 80 may run from the energy storage and/or generation system 40 along the top of the body 14 towards the cab 16 before navigating a top-forward corner of the body 14, running downward along the front of the body 14, navigating a bottom-forward corner of the body 14 and into the frame 12, and running along (and/or within) the frame 12 in the direction of the pivot 66 to connect to the terminal 50.

Figure 13:
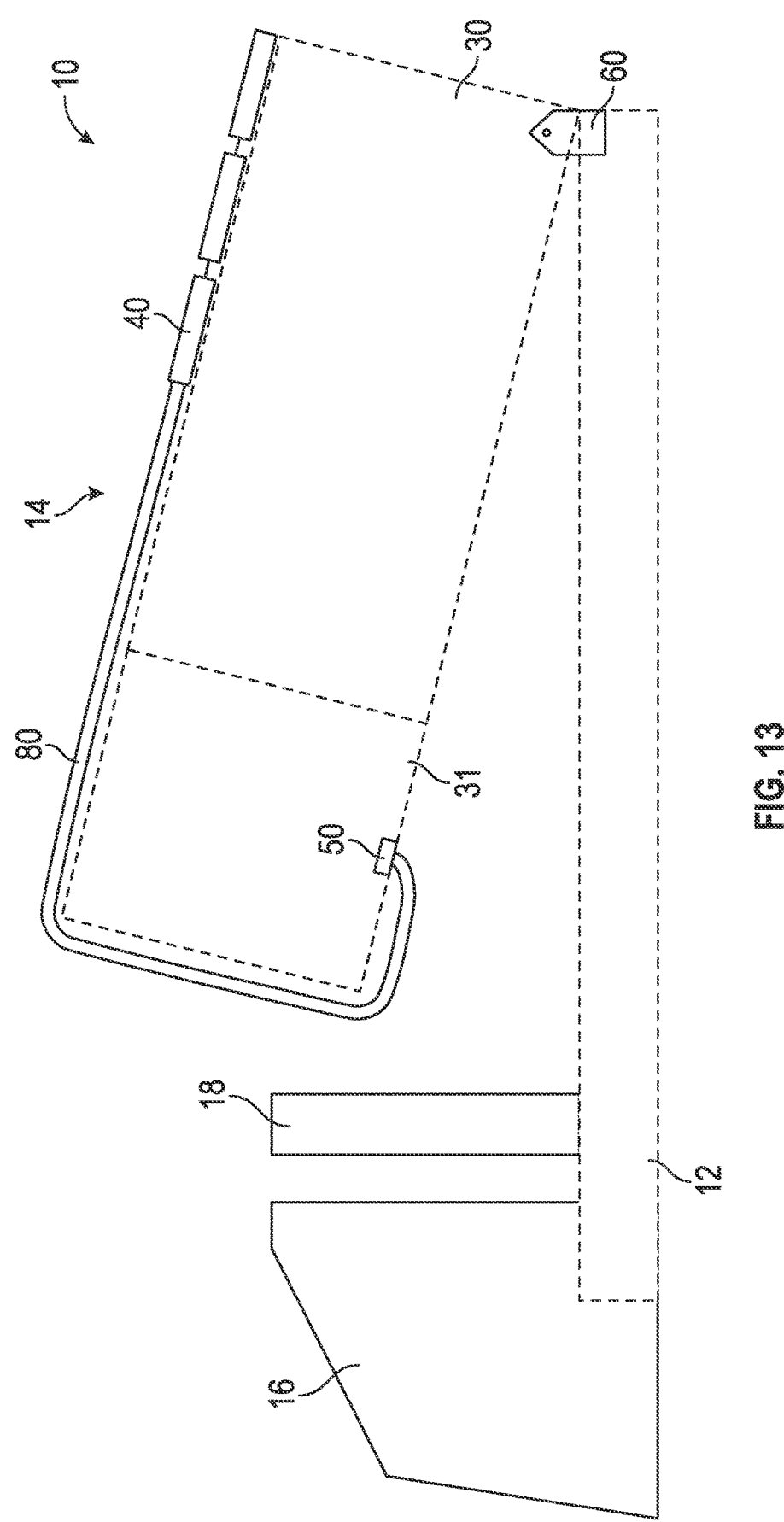
FIG. 13 is a side cross-sectional view of the refuse vehicle of FIG. 12 with a body lifted relative to a chassis, according to some embodiments.

Referring now to FIG. 13, the battery cable 80 of the vehicle 10 is shown in the arrangement depicted with reference to FIG. 12 with the body 14 lifted, according to some embodiments. As shown, when the body 14 is lifted (as opposed to the arrangement of the body 14 depicted with reference to FIG. 12), when the energy storage and/or generation system 40 is located on top of the body 14 as depicted, the battery cable 80 may generally maintain the same arrangement as depicted with reference to FIG. 12.

Figure 14:
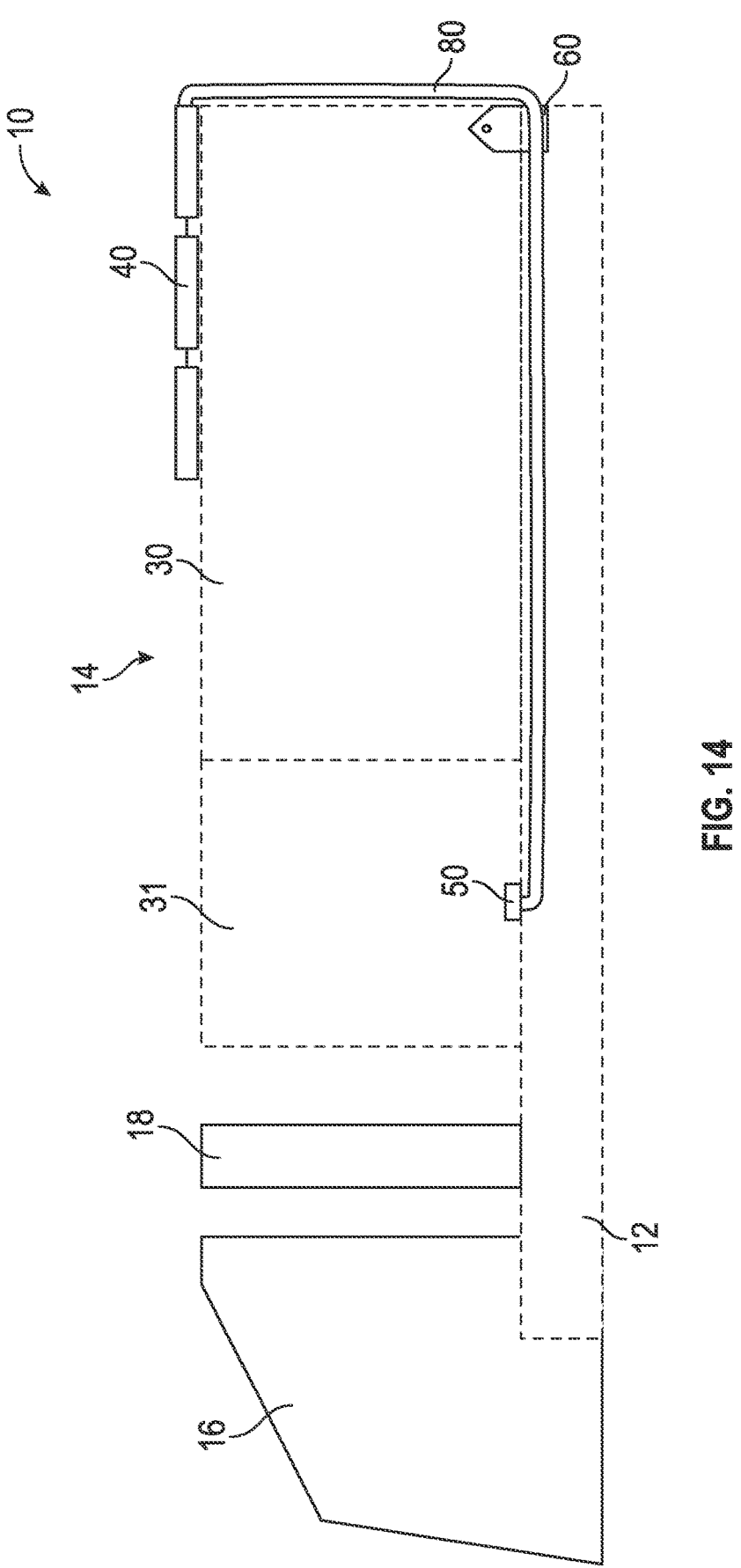
FIG. 14 is another side cross-sectional view of the refuse vehicle of FIG. 1 with a battery cable, according to some embodiments.

Referring now to FIG. 14, the battery cable 80 of the vehicle 10 is shown connecting the energy storage and/or generation system 40 to the terminal 50 with the energy storage and/or generation system 40 positioned on top of the body 14 in an alternative arrangement as opposed to the embodiments depicted with reference to FIGS. 12 and 13. As shown, the battery cable 80 may run from the energy storage and/or generation system 40 to the terminal 50 by navigating a top-rear corner of the body 14, down a rear face of the body 14, around the pivot 66 to the frame 12, along (and within, in some embodiments) the frame 12 in the direction of the cab 16 to reach the terminal 50. In some embodiments, the battery cable may run along the bottom rear corner of the body without running around the pivot 66.

Figure 15:
FIG. 15 is a side cross-sectional view of the refuse vehicle of FIG. 14 with a body lifted relative to a chassis, according to some embodiments.

Referring now to FIG. 15, the battery cable 80 is shown in the arrangement depicted with reference to FIG. 14 with the body 14 lifted, according to some embodiments. In some embodiments, the battery cable 80 may bend, flex, and extend in various directions to facilitate the lifting of the body 14. Alternatively, the battery cable may remain secured against the rear and underside of the body 14.

Figure 16:
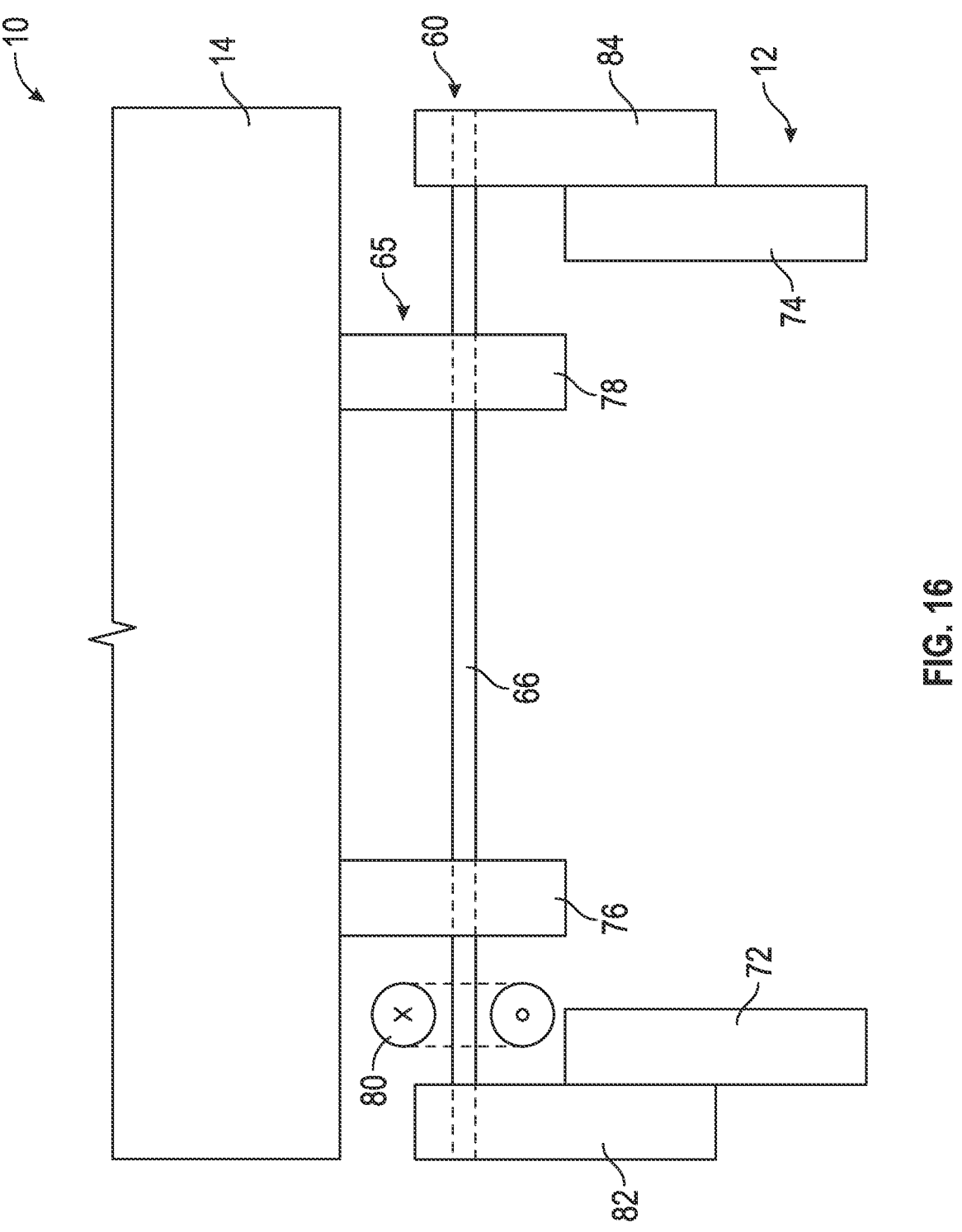
FIG. 16 is a rear view of pivots of the refuse vehicle of FIG. 1, according to some embodiments.

Referring now to FIG. 16, the battery cable 80 of the vehicle 10 is schematically shown navigating (e.g., running around) the pivot 66 of the pivot assembly 60, according to some embodiments. For example, the battery cable 80 as depicted may be arranged navigating the pivot 66 when the energy storage and/or generation system 40 is positioned on the frame 12, as depicted with reference to FIGS. 10 and 11. As shown, the frame 12 includes a left rail 72 and a right rail 74 (from the perspective of the rear face of the vehicle 10). The base 65 may form a similar pair of separate rails 76, 78, as shown, that may form part of the pivot assembly 60. In other embodiments, the base 65 is a solid member filling the entire cavity depicted between the separate rails 76, 78. The crossbar or pivot 66 may run laterally between two members 82, 84 of the pivot assembly 60 to facilitate the rotatable coupling of the body 14 to the frame 12. The two members 82, 84 of the pivot assembly 60 may be coupled to the rails 72, 74 of the frame 12. The crossbar 66 may be coupled to the two members 82, 84 (e.g., brackets, plates, etc.) of the pivot assembly 60 and to the two rails 76, 78 of the base 65. The crossbar 66 may be rotatably coupled to the rails 76, 78, to the members 82, 84, or to the rails 76, 78 and the members 82, 84 to enable the body 14 to pivot relative to the frame 12. Thus, in some embodiments, when the body 14 is lifted relative to the frame 12, a portion of the weight of the body 14 (that is not supported by the lift cylinders 17) is supported via the base 65 being supported by the crossbar 66, which in turn is supported by the two members 82, 84 of the pivot assembly 60, which in turn are supported by the frame 12 (e.g., the left rail 72 and the right rail 74 of the frame 12), which are in turn generally supported by the wheels 22. In some embodiments, the rails 72, 74 or another member of the frame 12 may be directly coupled to the crossbar 66, and the members 82, 84 may not be required. For example, the rails 76, 78 may extend farther downward, or the rails 72, 74 may extend further upward in the area of the pivot assembly 60 such that the crossbar 66 may be coupled to both the rails 76, 78 and the rails 72, 74.

As shown, the battery cable 80 may run between the left member 82 of the pivot assembly 60 and the left rail 76 of the base 65. In other embodiments, the battery cable 80 runs in between the separate rails 76, 78 of the base 65. In other embodiments still, the battery cable 80 runs outside of the frame 12 (e.g., around the members 82, 84 of the pivot assembly 60). As shown, the battery cable 80 may run from the energy storage and/or generation system 40 along the frame 12, reach the pivot assembly 60 below the crossbar 66 (represented by the cross-section portion of the battery cable 80 represented by a dot symbol, indicating the battery cable 80 is extending out of the page and away from the cab 16), around and above the crossbar 66, (represented by the "X" symbol, indicating that the battery cable 80 is extending into the page and towards the cab 16) and back along the underside of the body 14 to connect to the terminal 50.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (i.e., permanent or fixed) or moveable (i.e., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (i.e., directly coupled), the generic definition of "coupled" provided above is modified by the plain language meaning of the additional term (i.e., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (i.e., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A vehicle comprising:
   a chassis;
   a battery coupled to the chassis;
   a body pivotally coupled to the chassis by a pivot assembly and comprising a terminal electrically coupled to one or more electrical components of the body;
   an actuator coupled to the body and the chassis and configured to lift and pivot the body relative to the chassis;
   a battery cable electrically coupling the battery to the terminal, wherein the battery cable is configured to flex at a first angle when the body is in a first position supported by the chassis and configured to flex at a second angle when the body is in a second position lifted above the chassis.

2. The vehicle of claim 1, wherein when the body is in the first position, a first end of the battery cable extends from the battery in a first direction, a second end of the battery cable extends from the terminal in the first direction, and the battery cable forms a half loop between the first end and the second end.

3. The vehicle of claim 2, wherein when the body is in the second position, the first end of the battery cable and the second end of the battery cable form an obtuse angle.

4. The vehicle of claim 2, wherein the chassis comprises a pair of longitudinal frame rails, wherein when the body is in the first position, the battery cable does not extend above an upper surface of either frame rail or below a lower surface of either frame rail.

5. The vehicle of claim 4, wherein the battery and the battery cable are positioned between the frame rails.

6. The vehicle of claim 1, wherein the body is configured to pivot relative to the chassis about a pivot of the pivot assembly, wherein the battery cable extends from the battery, wraps around the pivot, and extends to the terminal.

7. The vehicle of claim 6, wherein the terminal is coupled to an underside of the body, a first end of the battery cable extends from the battery along the chassis to the pivot, and a second end of the battery cable extends from the terminal along the underside of the body.

8. The vehicle of claim 7, wherein when the body is in the first position, the first end of the battery cable and the second end of battery cable do not extend above an upper surface of the chassis or below a lower surface of the chassis.

9. The vehicle of claim 7, wherein the second end of the battery cable is coupled to the underside of the body such that when the body is lifted into the second position, the second end of the battery cable is lifted along with the body.

10. The vehicle of claim 6, wherein the pivot assembly further comprises a pair of members coupled to the chassis, wherein the pivot comprises a crossbar that rotatably couples the pair of members to the body.

11. The vehicle of claim 10, wherein the battery cable wraps around the crossbar between one of the members and a longitudinal rail of the body.

12. The vehicle of claim 1, wherein the actuator is an electromechanical actuator electrically coupled to the terminal and configured to be powered by the battery.

13. The vehicle of claim 12, wherein the actuator comprises:

a cylinder base coupled to the body and electrically coupled to the terminal; and an actuator rod coupled to the frame and configured to extend from the cylinder base to lift the body.

\* \* \* \* \*